US009846695B2

(12) United States Patent
Okabe (10) Patent No.: US 9,846,695 B2
(45) Date of Patent: Dec. 19, 2017

(54) INFORMATION PROCESSING APPARATUS, CONTROL METHOD, AND STORAGE MEDIUM STORING PROGRAM

(71) Applicant: CANON KABUSHIKI KAISHA, Tokyo (JP)

(72) Inventor: Kouya Okabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 380 days.

(21) Appl. No.: 14/685,396

(22) Filed: Apr. 13, 2015

(65) Prior Publication Data

US 2015/0310033 A1 Oct. 29, 2015

(30) Foreign Application Priority Data

Apr. 25, 2014 (JP) ................................. 2014-092003

(51) Int. Cl.
*G06F 17/30* (2006.01)

(52) U.S. Cl.
CPC .. *G06F 17/30011* (2013.01); *G06F 17/30171* (2013.01); *G06F 17/30203* (2013.01); *G06F 17/30345* (2013.01); *G06F 17/30117* (2013.01)

(58) Field of Classification Search
CPC ......... G06F 17/30203; G06F 17/30117; G06F 17/30011; G06F 17/30345; G06F 17/30171
USPC ........................................................ 707/827
See application file for complete search history.

(56) References Cited

U.S. PATENT DOCUMENTS

| 5,692,178 | A  | * | 11/1997 | Shaughnessy | .... G06F 17/30171 |
| 5,948,062 | A  | * | 9/1999  | Tzelnic | ............... G06F 11/1435 |
|           |    |   |         |         | 348/E5.008 |
| 7,107,527 | B2 | * | 9/2006  | Takahashi | ......... G06F 17/30011 |
|           |    |   |         |         | 707/E17.005 |
| 8,037,107 | B2 | * | 10/2011 | Kagawa | ............ G06F 17/30616 |
|           |    |   |         |         | 707/803 |
| 8,046,365 | B2 | * | 10/2011 | Saito | .................... G06F 21/6227 |
|           |    |   |         |         | 707/673 |
| 8,185,595 | B2 |   | 5/2012  | Okabe   |         |

(Continued)

FOREIGN PATENT DOCUMENTS

JP 2002-123309 4/2002

OTHER PUBLICATIONS

Olson, Michael A., "The Design and Implementation of the Inversion File System", USENIX 1993, San Diego, CA, Jan. 25-29, 1993, 14 pages.*

(Continued)

*Primary Examiner* — Robert Stevens
(74) *Attorney, Agent, or Firm* — Fitzpatrick, Cella, Harper & Scinto (57) ABSTRACT

An information processing apparatus is capable of communicating with a file server storing a document file and with a storage unit storing information on the document file as a record. The information processing apparatus accepts a request to perform an operation on a document file, and registers entity data of the document file in the file server. After this, the information processing apparatus locks a record corresponding to a folder storing the document file, registers a record corresponding to the document file, and updates information of the locked record corresponding to the folder.

9 Claims, 8 Drawing Sheets

(56) References Cited

U.S. PATENT DOCUMENTS

2009/0132548 A1\* 5/2009 Kagawa ............ G06F 17/30616

OTHER PUBLICATIONS

Burns, Randal C., et al., "Semi-Preemptible Locks for a Distributed File System", PCCC 2000, Phoenix, AZ, Feb. 5-8, 2000, pp. 397-404.\*
Santry, Douglas S., et al., "Deciding when to forget in the Elephant file system", SOSP-17, Kiawah Island, SC, Dec. 1999, pp. 110-123.\*
Bhattacharya, Suparna, et al., "Coordinating Backup/Recovery and Data Consistency Between Database and File Systems", ACM SIGMOD 2002, Madison, WI, Jun. 4-6, 2002, pp. 500-511.\*
Hsiao, Hui-I, "DLFM: A Transactional Resource Manager", MOD 2000, Dallas, TX, 2000, pp. 518-528.\*
Levy, Eliezer, et al., "Distributed File Systems: Concepts and Examples", ACM Computing Surveys, vol. 22, No. 4, Dec. 1990, pp. 321-374.\*

\* cited by examiner

| | 501 | 502 | 503 | 504 | 505 |
|---|---|---|---|---|---|
| FOLDER ID | FOLDER PATH | FOLDER SIZE | CREATION DATE AND TIME | UPDATE DATE AND TIME |
| F00000381 | AAA/BBB/CCC | 350 | 2013/05/12 10:33:25 | 2013/05/13 15:03:53 |
| F00000382 | AAA/BBB/DDD | 2835 | 2013/05/12 11:00:17 | 2013/05/12 11:00:17 |
| F00000383 | AAA/XXX/YYY/ZZZ | 120692 | 2013/05/14 16:02:00 | 2013/05/14 16:05:10 |
| F00000384 | AAA/SSS/TTT | 3742 | 2013/05/14 16:31:21 | 2013/05/15 09:24:56 |

FIG. 5B

| 511 | 512 | 513 | 514 | 515 | 516 | 517 |
|---|---|---|---|---|---|---|
| DOCUMENT ID | DOCUMENT NAME | PARENT FOLDER ID | DOCUMENT SIZE | FILE SERVER PATH | CREATION DATE AND TIME | UPDATE DATE AND TIME |
| D00012524 | AAA.txt | F00000025 | 25 | /file/AAA/aJeTkw | 2013/06/03 11:35:42 | 2013/06/03 11:36:53 |
| D00012525 | BBB.doc | F00000382 | 3075 | /file/AAA/QnJWjd | 2013/06/03 13:40:11 | 2013/06/05 12:00:02 |
| D00012526 | CCC.xls | F00001038 | 432 | /file/AAA/muWizI | 2013/06/03 14:52:48 | 2013/06/03 14:52:48 |
| D00012527 | DDD.pdf | F00000973 | 8263 | /file/AAA/TXiejA | 2013/06/03 18:20:20 | 2013/06/07 10:59:31 |

FIG. 5C

| 521 | 522 | 523 | 524 |
|---|---|---|---|
| FILE SERVER PATH | UPDATE DATE AND TIME | STATE | NUMBER OF RETRIES |
| /file/AAA/ZzQidN | 2013/07/12 10:34:13 | 1 | 0 |
| /file/AAA/vmwAeP | 2013/07/12 12:51:17 | 2 | 0 |
| /file/AAA/vNaEER | 2013/07/14 15:08:49 | 3 | 3 |
| /file/AAA/CdRwS | 2013/07/15 10:45:27 | 0 | 0 |

INFORMATION PROCESSING APPARATUS, CONTROL METHOD, AND STORAGE MEDIUM STORING PROGRAM

BACKGROUND OF THE INVENTION

Field of the Invention

The present invention relates to an information processing apparatus that communicates with a file server managing a document file, a control method, and a storage medium storing a program.

Description of the Related Art

Document management systems are known which store documents and provide various functions in response to requests from clients. In such a system, information on a document is registered and managed in a database. A document entity, which is a file itself, is also stored and managed in the database.

In the case where two or more programs operate simultaneously to read or write data from or into the database, these programs may access the same data simultaneously. Here, when the access operations are performed for both reading and writing of data, appropriate exclusive control is required. To be more specific, when a program A writes into specific data and a different program B also accesses this specific data at the same time, data consistency cannot be maintained. To prevent such a problem, while the program A is writing into the specific data, the program B is blocked to access this data. This block processing is phrased as "the program A locks the data". The blocked program B waits to perform its own operation until the data is unlocked. Alternatively, the program B determines that an error occurs and suspends the operation.

A system is known which includes a plurality of apparatuses and a common database (see Japanese Patent Laid-Open No. 2002-123309). When one of the apparatuses attempts to update data stored in the database, all the apparatuses are notified of the locked state of the database. Then, the lock is released only for the apparatus attempting the update, and this apparatus executes the update processing. After the completion of the processing, the system unlocks the database for all the apparatuses.

As Japanese Patent Laid-Open No. 2002-123309 describes, data consistency can be maintained by using the lock. However, processing related to a document entity, such as document registration, is more likely to take longer time than the processing related to information associated with the document, such as a document name. For this reason, a continuous lock applied to the document entity significantly affects the overall system, delaying the processing performed by the overall system, for example.

SUMMARY OF THE INVENTION

An aspect of the present invention is to eliminate the above-mentioned problems with the conventional technology. The present invention provides an information processing apparatus that reduces a lock time during which access to data is restricted, a control method, and a storage medium storing a program.

The present invention in one aspect provides an information processing apparatus capable of communicating with a file server storing a document file and with a storage unit storing information on the document file as a record, the information processing apparatus comprising: an acceptance unit configured to accept a request to register a document file; a first registration unit configured to register entity data of the registration-requested document file in the file server; a lock unit configured to, in a case where the first registration unit successfully registers the entity data in the file server, lock a record corresponding to a folder storing the document file in the storage unit; a second registration unit configured to register information on the registration-requested document file in the storage unit, as a record corresponding to the document file; and an update unit configured to update information of the record locked by the lock unit and corresponding to the folder storing the document file, and unlock the updated record.

According to the present invention, a lock time during which access to data is restricted can be reduced.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. The same structural elements are given the same reference signs, and their description is omitted.

Figure 1:
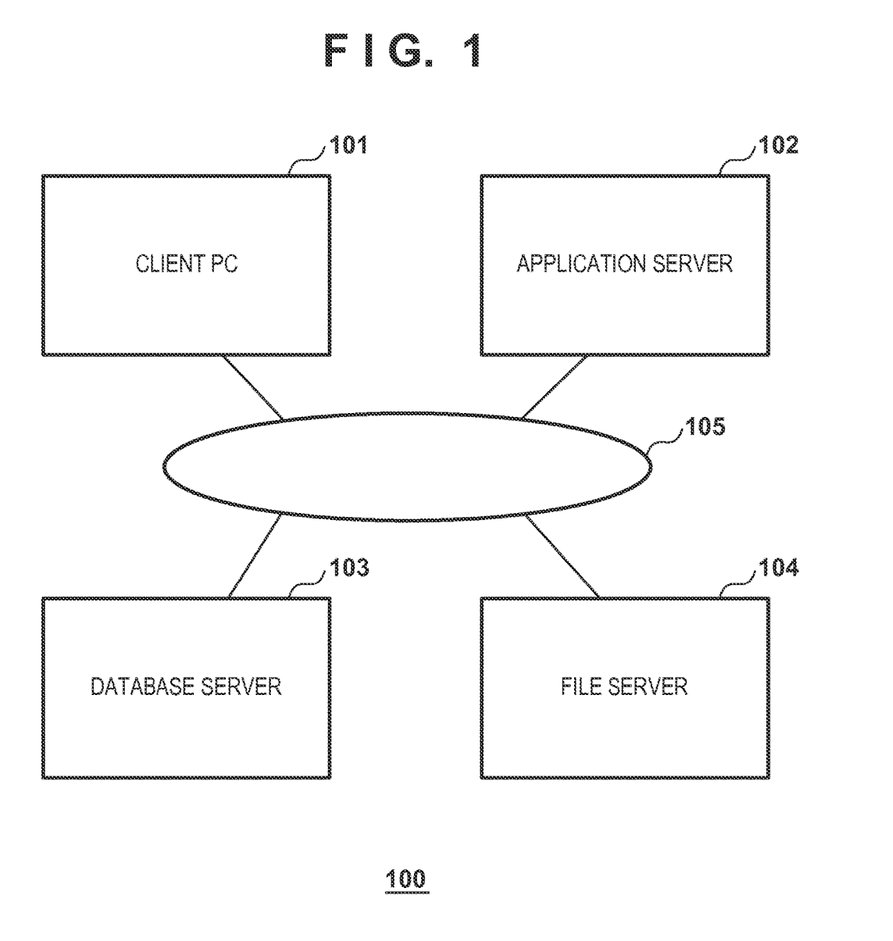
FIG. 1 is a diagram showing the system structure including an information processing apparatus.

FIG. 1 is a diagram showing the system structure that includes an information processing apparatus in an embodiment of the present invention. A system 100 shown in FIG. 1 is a document management system that manages document files operable (registerable or deletable, for example) by a user. A client PC 101 is, for example, a general-purpose personal computer (PC) used by the user. For instance, the client PC 101 requests an application server 102 to register a new document file in a file server. The client PC 101 can also request the application server 102 to obtain a document. Then, the document file obtained from the application server 102 can be viewed and edited on the client PC 101.

In response to such a request from the client PC 101, the application server 102 reads information managed by a database server 103 and writes information to the database server 103. The application server 102 also transmits a document file obtained from a file server 104 to the client PC 101. The database server 103 manages a database including information on document files and information on folders. For example, the information refers to attribute information of a document file or folder, such as a name, creation date and time, update date and time, and size.

Figure 5A:
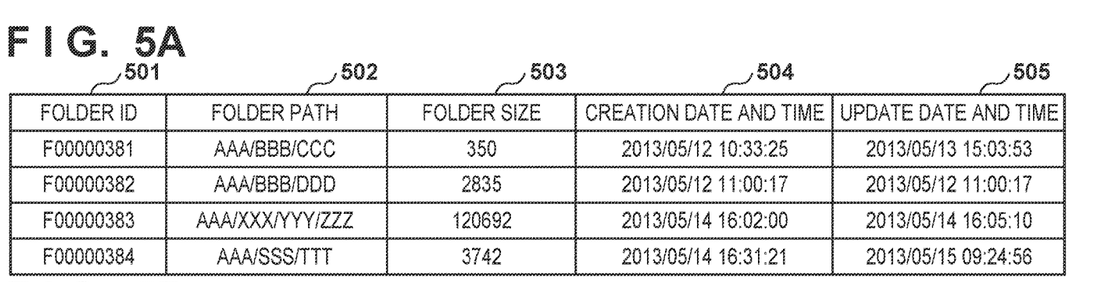
FIGS. 5A to 5C are diagrams each showing a table of a database server.
Figure 5B:
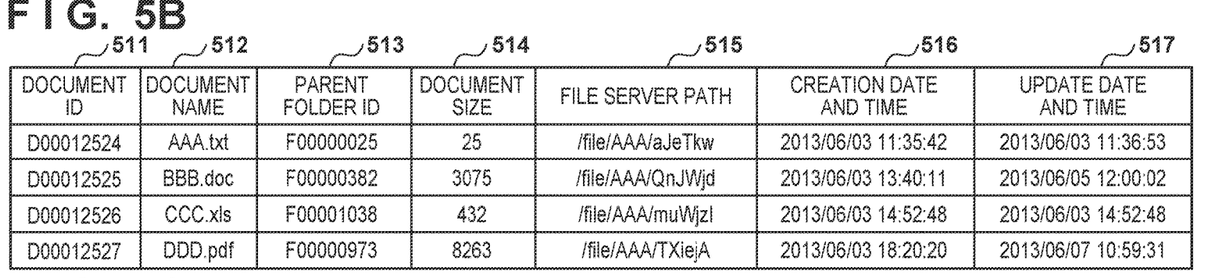
Figure 5C:
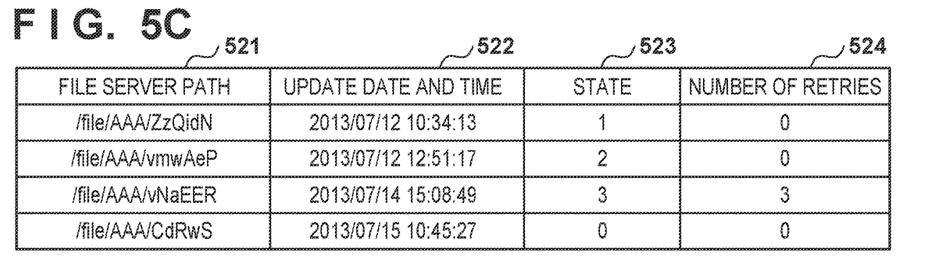

The database server 103 manages document file information on a document file stored in the file server 104 and folder information on a folder storing the document file, instead of managing a document file entity. The database server 103 manages the information on the document file in a document table and the information on the folder in a folder table. The database server 103 thus manages the information on the document file and folder in the separate tables (i.e. separate databases). In each of the tables, the information on the corresponding document file or folder is managed in a unit of record. The document file entity is stored in the file server 104 of the system 100. As shown in the tables of FIGS. 5A to 5C, each document file stored in the file server 104 is associated with the information on the corresponding document file managed by the database server 103. In this embodiment, the database server 103 is described as an example of a storage unit that stores the document file information. However, the application server 102 may include the structure of the database server 103.

The client PC 101, the application server 102, the database server 103, and the file server 104 are connected via a network 105, such as a LAN, so as to communicate with each other. The network 105 may be a wired network or a wireless network. Each of the apparatuses shown in FIG. 1 does not need to be a single apparatus. For instance, each apparatus may include apparatuses operating in cooperation with each other. Alternatively, the apparatuses shown in FIG. 1 may be integrated into one apparatus.

Figure 2:
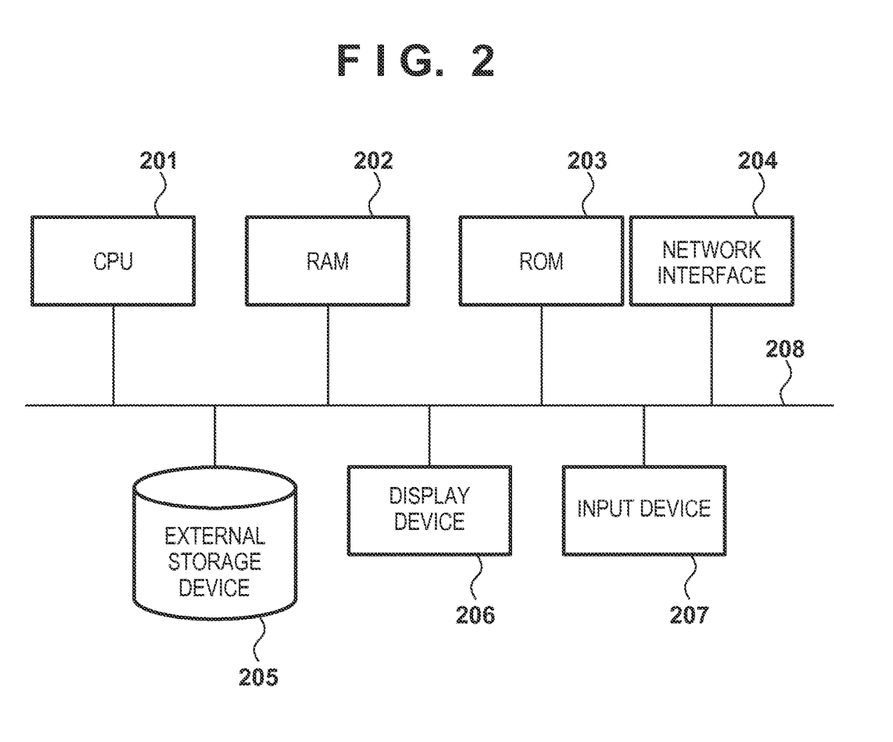
FIG. 2 is a block diagram showing the hardware structure of each apparatus.

FIG. 2 is a block diagram showing the hardware structure of each apparatus shown in FIG. 1. Each of the client PC 101, the application server 102, the database server 103, and the file server 104 shown in FIG. 1 has the blocks shown in FIG. 2. A CPU 201 controls the overall apparatus including the CPU 201. The CPU 201 also reads a control program from an external storage device 205 such as a hard disk or from a ROM 203 into a RAM 202 and executes the control program to enable the operation in this embodiment. The external storage device 205 stores a control program, setting parameters, and the like. In the case where the structure shown in FIG. 2 is the structure of the file server 104, the external storage device 205 stores the document files.

A display device 206 is, for example, a display, and displays a user interface screen used for executing functions of a document file management system. An input device 207 includes, for example, a keyboard and a pointing device, with which the user can instruct execution of the functions, such as registration or deletion of a document file in or from the database, on the user interface screen. A network interface 204 connects the apparatus to the network 105 and thus enables the apparatus to communicate with the other apparatuses via the network 105. The blocks shown in FIG. 2 are connected via a system bus 208 so as to communicate with each other.

Figure 3:
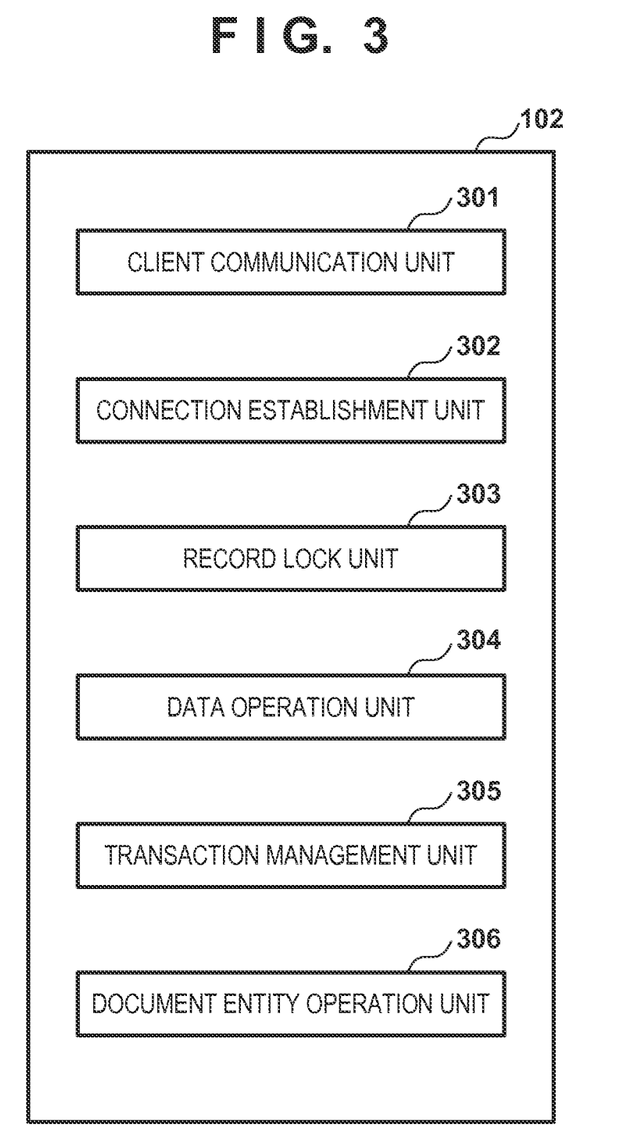
FIG. 3 is a block diagram showing the software structure of an application server.

FIG. 3 is a block diagram showing the software structure of the application server 102. Each of the blocks shown in FIG. 3 is implemented by the CPU 201 of the application server 102. A client communication unit 301 communicates with the client PC 101. For example, the client communication unit 301 receives, from the client PC 101, a command requesting registration or deletion of a document file. In response to the request from the client PC 101, the client communication unit 301 transfers (responds with) a result of the execution to the client PC 101. Additionally, in response to a request from the client PC 101 to obtain a document file, the client communication unit 301 may transfer the document file to the client PC 101.

A connection establishment unit 302 establishes connection with the database server 103 to access a specific database area. The specific database area refers to a storage area of the table managed by the database server 103 as described later. A record lock unit 303 locks a specific record in the table of the database server 103. The locked record is thus inaccessible from another program (or, from another thread or the like) different from the program executing the locking. In this case, the program blocked from accessing the record is notified of an error immediately. Alternatively, the blocked program waits until this record is unlocked or waits for a predetermined period of time.

A data operation unit 304 performs an operation, such as obtainment, registration, update, or deletion of information, on the corresponding record in the table of the database server 103. A transaction management unit 305 instructs the database server 103 to commit or roll back a series of processes (transaction) for the table of the database server 103. "Commit" refers to the act of confirming a transaction. In other words, unless committed, any process (operation) executed in the transaction is not actually reflected in the table of the database server 103. "Rollback", which corresponds to the opposite of the commit, refers to the act of cancelling a process in the transaction to recover the table to the pre-transaction state. When the data operation unit 304 instructs the database server 103 to perform a commit or rollback, the lock applied to the record of the table is released. In this embodiment, the lock time lasts from when the record lock unit 303 locks the corresponding record in the table of the database server 103 to when the transaction management unit 305 instructs a commit or rollback. A document entity operation unit 306 performs an operation, such as obtainment, registration, update, or deletion of a document file itself (entity), on the file server 104.

[Registration Processing]

Figure 4:
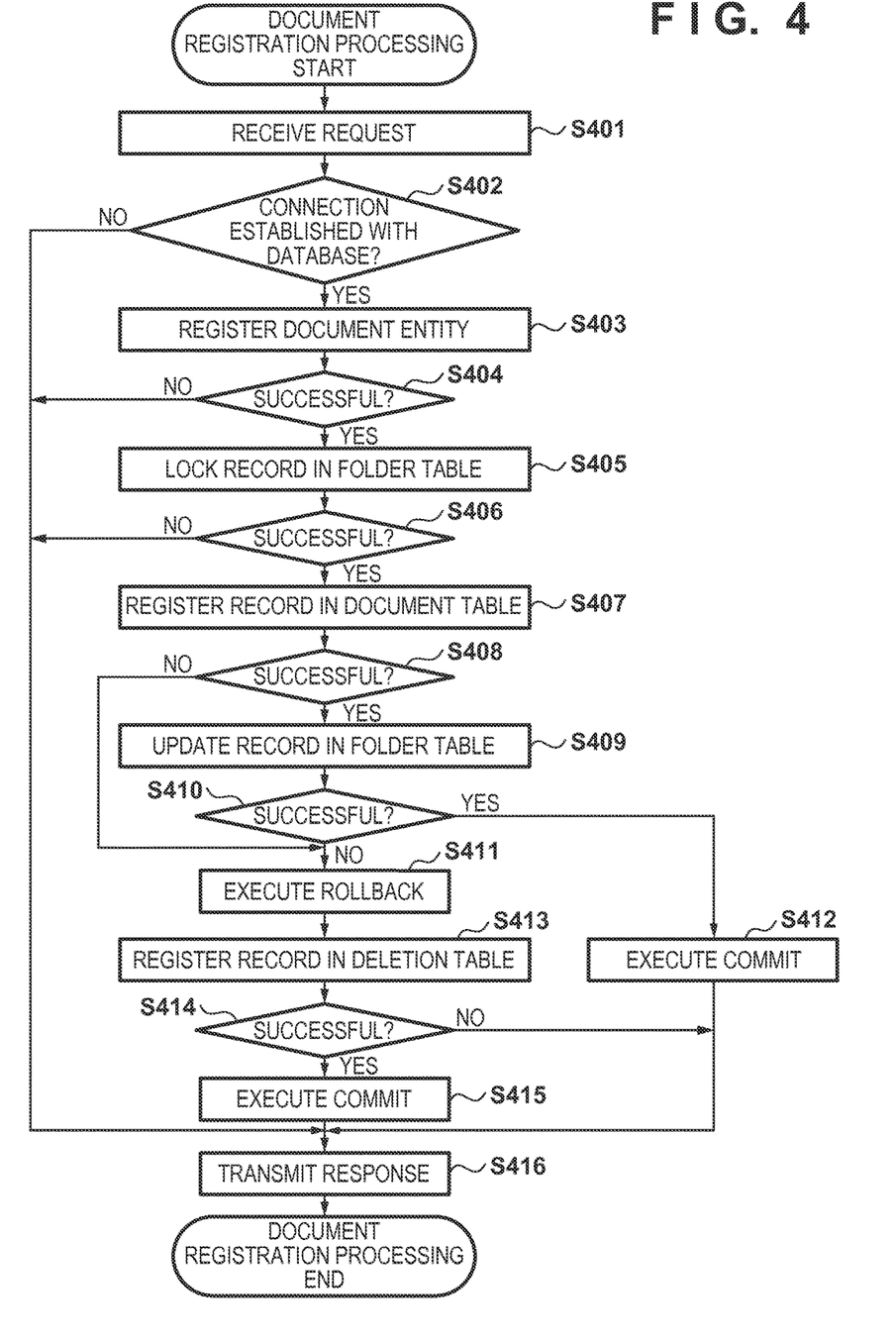
FIG. 4 is a diagram showing a process performed when registration of a document file is requested.

FIG. 4 is a flowchart showing the processing performed by the application server 102 accepting a request for registration of a document file from the client PC 101. Each of the processes shown in FIG. 4, FIG. 6, FIG. 7, and FIG. 8 described later is achieved by the CPU 201 reading the control program from the ROM 203 or the external storage device 205 and executing the control program. The result and data obtained from each process shown in FIG. 4 are stored into the RAM 202, the ROM 203, and the external storage device 205. Thus, each of the blocks shown in FIG. 2 can use the stored result and data. The result and data obtained from each process shown in FIG. 4 can also be used by the other apparatuses via the network interface 204.

First, the client communication unit 301 of the application server 102 receives, from the client PC 101, the entity data of a document file (hereafter, this data is simply referred to as the document file) and a request for registration of the document file (step S401). In this way, when registering the document file in the file server 104, the client PC 101 in the system 100 transmits the registration request to the application server 102 instead of directly accessing the file server 104.

The connection establishment unit 302 establishes connection with the storage areas of the tables in the database server 103, and determines whether the connection establishment with the database server 103 is successful or unsuccessful (step S402). In the case where it is determined that the connection establishment is successful, the processing proceeds to step S403. In the case where it is determined that the connection establishment is unsuccessful, the processing proceeds to step S416. When the processing proceeds to step S416 from step S402, the client communication unit 301 notifies the client PC 101 of the registration error as a response and then ends the processing in FIG. 4.

In the case where it is determined that the connection establishment is successful, the document entity operation unit 306 executes the registration processing on the entity data of the document file received in step S401 in the file server 104 (step S403). Then, whether the registration of the document file in the file server 104 is successful or unsuccessful is determined (step S404). In the case where it is determined that the registration of the entity data of the document file is successful, the processing proceeds to step S405. In the case where it is determined that the registration of the entity data of the document file is unsuccessful, the processing proceeds to step S416. When the processing proceeds to step S416 from step S404, the client communication unit 301 notifies the client PC 101 of the registration error as a response and then ends the processing in FIG. 4. The connection establishment, document file registration, or other command executions performed between the apparatuses can fail due to the communication situation of the network 105, for example. In the following, when a command is executed between the apparatuses, whether the command execution is successful or unsuccessful is determined as needed.

In the case where the processing proceeds to step S405 from step S404, the record lock unit 303 executes the lock processing on the record corresponding to the folder that is included in the folder table of the database server 103 and stores the document file in the file server 104. The folder table will be described later. The lock processing refers to, for example, the restriction processing by which the client communication unit 301 rejects another operation request (including a registration request) for the folder or document file corresponding to the locked record.

The record lock unit 303 determines whether the lock processing in step S405 is successful or unsuccessful (step S406). In the case where it is determined that the lock processing is successful, the processing proceeds to step S407. In the case where it is determined that the lock processing is unsuccessful, the processing proceeds to step S416. When the processing proceeds to step S416 from step S407, the client communication unit 301 notifies the client PC 101 of the registration error as a response and then ends the processing in FIG. 4.

In the case where the processing proceeds to step S407 from step S406, the data operation unit 304 performs the processing of registering the information on the document file, which is registered in the file server 104 in step S403, as a record corresponding to the document file in the document table of the database server 103. In detail, the data operation unit 304 creates a record corresponding to the document file, which is requested to be registered, in the document table and then registers the information on the document file in the created record. The document table will be described later. The data operation unit 304 next determines whether the registration processing in the document table in step S407 is successful or unsuccessful (step S408). In the case where it is determined that the registration processing in the document table is successful, the processing proceeds to step S409. In the case where it is determined that the registration processing in the document table is unsuccessful, the processing proceeds to step S411. When the processing proceeds to step S411 from step S408, the transaction management unit 305 executes a rollback. When the rollback is executed, the registration processing in the document table of the database server 103 in step S407 is cancelled and the record locked in step S405 is unlocked.

In the case where the processing proceeds to step S409 from step S408, the data operation unit 304 performs the processing of updating the record information in the folder table locked in step S405. The update processing refers to, for example, updating the total file size in the case where the folder manages the total size of the document files directly stored in this folder. Alternatively, the update processing refers to updating the update date and time of the folder. The data operation unit 304 next determines whether the processing of updating the record information in step S409 is successful or unsuccessful (step S410). In the case where it is determined that the processing of updating the record information is successful, the processing proceeds to step S412. In the case where it is determined that the processing of updating the record information is unsuccessful, the processing proceeds to step S411. When the processing proceeds to step S411 from step S410, the transaction management unit 305 executes a rollback. When the rollback is executed, the registration processing in the document table of the database server 103 in step S407 and the update processing for the record information in step S409 are cancelled. Then, the record locked in step S405 is unlocked.

In the case where the processing proceeds to step S412 from step S410, the transaction management unit 305 executes a commit. When the commit is executed, the processing of updating the record information in step S409 is confirmed. Thus, the updating of the record information in the document table of the database server 103 is confirmed, and the record locked in step S405 is unlocked. After the process in step S412, the client communication unit 301 notifies the client PC 101 of the successful registration as a response to the registration request for the document file (step S416).

After executing the rollback in step S411, the data operation unit 304 executes the processing of registering a record, which is to be deleted, in a deletion table of the database server 103 to delete the document file registered in the file sever 104 in step S403 (step S413). The deletion table will be described later. The data operation unit 304 next determines whether the processing of registering the record in the deletion table in step S413 is successful or unsuccessful (step S414). In the case where it is determined that the processing of registering the record in the deletion table is successful, the processing proceeds to step S415. In the case where it is determined that the processing of registering the record in the deletion table is unsuccessful, the processing proceeds to step S416. When the processing proceeds to step S416 from step S414, the client communication unit 301 notifies the client PC 101 of the error as a response and then ends the processing in FIG. 4.

In the case where the processing proceeds to step S415 from step S414, the transaction management unit 305 executes a commit. When the commit is executed, the processing of registering the record in the deletion table in step S413 is confirmed and the to-be-deleted record is thus registered in the deletion table of the database server 103. After the process in step S415, the client communication unit 301 notifies the client PC 101 of the registration error as a response to the registration request for the document file (step S416).

In the processing shown in FIG. 4, the document file corresponding to the record registered in the deletion table of the database server 103 is deleted from the file server 104 by the processing shown in FIG. 7 described later.

Thus, in this embodiment, the client PC 101 does not directly access the file server 104, and the application server 102 instead accepts the registration request for the document file from the client PC 101. The application server 102 stores the document file received from the client PC 101 into the file server 104. After this, the application server 102 executes the lock processing on the corresponding record in the table stored in the database server 103. The application server 102 updates the information of this record after the lock processing performed to block another operation request.

In this embodiment, the lock processing is not performed on the document file entity, but on the corresponding record in the table stored in the database server 103. Thus, when accepting the registration request for the document file from the client PC 101, the application server 102 controls an access destination to access the table in the database server 103 instead of accessing the file server 104, in accordance with the received registration request. The application server 102 performs the lock processing when accessing the table in the database server 103.

For example, suppose another client PC 101 transmits, to the application server 102, a request to change the filename of the document file corresponding to the locked record. In this case, the client PC 101 transmitting the filename change request is notified that the record is locked. Then, the client PC 101 transmitting the request waits for the record to be unlocked.

In this embodiment, the lock time, during which the record is locked, is simply required for the application server 102 to update the record information in the table of the database server 103. The lock time is therefore shorter, as compared with the conventional case where the lock time also includes the time to store the document file into server (including the time to copy the file). In this conventional case, even though requesting only to change the attribute information of the document file, the client PC 101 transmitting the filename change request needs to wait during the lock time until the storage of the document file into the file server 104 is completed. In particular, when the document file is larger in size, the lock time is longer. In this embodiment, the lock time is simply the time to update the record information. Thus, the waiting time for the client PC 101 transmitting the filename change request is shorter. This can also reduce the case where the processing performed by the overall system 100 is delayed in consequence of the lock time affecting the overall system 100.

[Table in Database Server 103]

FIGS. 5A to 5C are diagrams each showing an example of the table (the list of document file information) stored in the database server 103. In this embodiment, the lock processing is not performed on the document file stored in the file server 104. Instead, the lock processing is performed on the corresponding record of the table stored in the database server 103 as shown in FIGS. 5A to 5C. FIG. 5A shows an example of the folder table. The folder table corresponds to the folders storing the document files in the file server 104. An item 501 indicates the folder ID identifying a current folder. An item 502 indicates path information including the folder name, the path being presented in order from high order. The item 502 may indicate the folder name and the path information in separate items. An item 503 indicates the folder size which is the total size of the document files stored directly in the current folder. An item 504 indicates the creation date and time of the folder. An item 505 indicates the update date and time of the folder. For example, the update date and time is updated when the folder name is changed or when the state of the document file stored directly in the current folder is changed by the above-mentioned registration processing or the like.

FIG. 5B shows an example of the document table. An item 511 indicates the document ID identifying a current document file. An item 512 indicates the filename of the document file. The item 512 may indicate the extension in a separate item. An item 513 indicates the folder ID identifying the folder storing the document file. The folder ID in the item 513 corresponds to the folder ID in the item 501. An item 514 indicates the size of the document file. An item 515 indicates path information (storage location) of the document file stored in the file server 104. The path information indicated in the item 515 may be different from the folder structure presented to the user. For example, the filename different from the filename in the item 512 may be managed in the item 515. The item 515 may also include information of the IP address of the file server 104. An item 516 indicates the creation date and time (i.e. the registration date and time) of the document file. An item 517 indicates the update date and time of the document file. For example, when the document file is updated or information on the document file, such as the filename, is updated, the date and time of this updating is stored.

FIG. 5C shows an example of the deletion table in which information on the document file to be deleted from the file server 104 is registered. An item 521 indicates path information of the document file stored in the file server 104, as with the item 515. However, note that the item 521 indicates the path information of the document file to be deleted from the file server 104. An item 522 indicates the update date and time at which the instruction to delete the document file is received from the application server 102. An item 523 indicates the state of the document file presented by the path information in the item 521. For example, in FIG. 5C, the state of the document file is represented by a numeric value as follows. "1" represents "Wait to be deleted", "2" represents "Currently being deleted", "3" represents "Currently retrying", and "4" represents "Deletion unsuccessful (deletion failure)". Other states may also be represented by the corresponding numeric values. An item 524 indicates the number of retries (the number of trials of the deletion processing). When the deletion of the document file is unsuccessful, the item 524 stores the number of times the deletion processing is retried. In this embodiment, the processing shown in FIG. 7 described later is performed on the information of the document file having the number of retries less than a predetermined upper limit. When the upper limit is reached, the item 523 indicates "Deletion unsuccessful".

[Deletion Processing]

Figure 6:
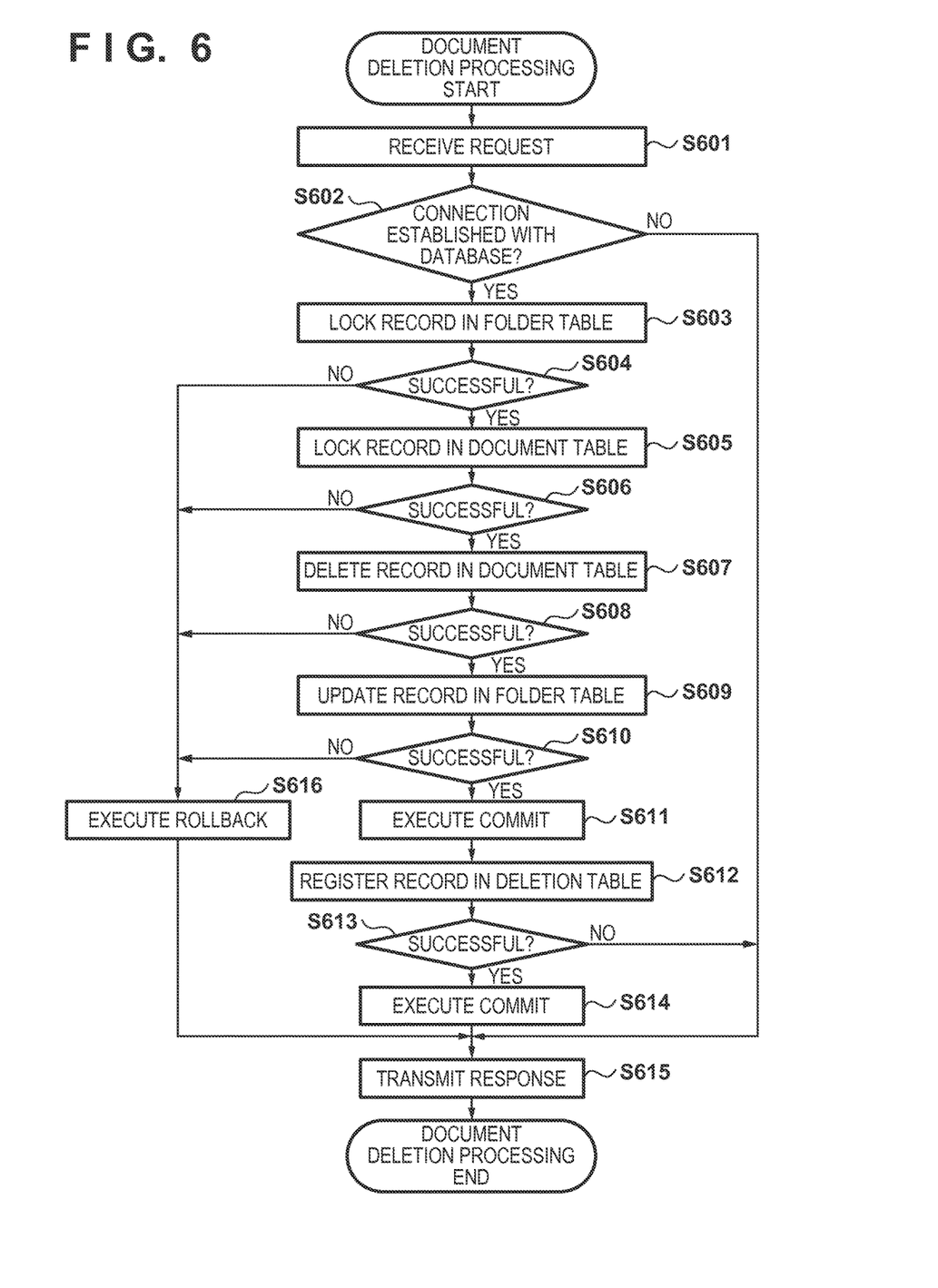
FIG. 6 is a diagram showing a process performed when deletion of a document file is requested.

FIG. 6 is a flowchart showing the processing performed by the application server 102 receiving a request from the client PC 101 to delete a document file. First, the client communication unit 301 receives the request for the document file deletion from the client PC 101 (step S601). In this embodiment, when deleting the document file from the file server 104, the client PC 101 transmits the deletion request to the application server 102 instead of directly accessing the file server 104.

The connection establishment unit 302 establishes connection with the storage areas of the tables in the database server 103, and determines whether the connection establishment with the database server 103 is successful or unsuccessful (step S602). In the case where it is determined that the connection establishment is successful, the processing proceeds to step S603. In the case where it is determined that the connection establishment is unsuccessful, the processing proceeds to step S615. When the processing proceeds to step S615 from step S602, the client communication unit 301 notifies the client PC 101 of the deletion error as a response and then ends the processing in FIG. 6.

In the case where it is determined that the connection establishment is successful, the record lock unit 303 performs the lock processing on the record corresponding to the folder storing the to-be-deleted document file (the parent folder of the document file) (step S603). The record lock unit 303 determines whether the lock processing in step S603 is successful or unsuccessful (step S604). In the case where it is determined that the lock processing is successful, the processing proceeds to step S605. In the case where it is determined that the lock processing is unsuccessful, the processing proceeds to step S616. When the processing proceeds to step S616 from step S604, the transaction management unit 305 executes a rollback. When the rollback is executed, the lock processing performed on the record in step S603 is cancelled (the record is unlocked). After this, the client communication unit 301 notifies the client PC 101 of the deletion error as a response and then ends the processing in FIG. 6 (step S615).

In the case where it is determined in step S604 that the lock processing is successful, the record lock unit 303 executes the lock processing on the record corresponding to the to-be-deleted document file (step S605). The record lock unit 303 next determines whether the lock processing executed in step S605 is successful or unsuccessful (step S606). In the case where it is determined that the lock processing is successful, the processing proceeds to step S607. In the case where it is determined that the lock processing is unsuccessful, the processing proceeds to step S616. When the processing proceeds to step S616 from step S606, the transaction management unit 305 executes a rollback. When the rollback is executed, the lock processing in each of steps S603 and S605 is cancelled (the records are unlocked). After this, the client communication unit 301 notifies the client PC 101 of the deletion error as a response and then ends the processing in FIG. 6 (step S615).

In the case where it is determined in step S606 that the lock processing is successful, the data operation unit 304 executes the deletion processing on the record corresponding to the to-be-deleted document file locked in step S605 (step S607). The data operation unit 304 next determines whether the record deletion processing executed in step S607 is successful or unsuccessful (step S608). In the case where it is determined that the record deletion processing is successful, the processing proceeds to step S609. In the case where it is determined that the record deletion processing is unsuccessful, the processing proceeds to step S616. When the processing proceeds to step S616 from step S608, the transaction management unit 305 executes a rollback. When the rollback is executed, the lock processing in each of steps S603 and S605 and the record deletion processing in step S607 are cancelled. After this, the client communication unit 301 notifies the client PC 101 of the deletion error as a response and then ends the processing in FIG. 6 (step S615).

In the case where it is determined in step S608 that the record deletion processing is successful, the data operation unit 304 executes the update processing on the record information corresponding to the folder storing the to-be-deleted document file locked in step S603 (step S609). The update processing refers to updating the total file size in the case where the folder manages the total size of the document files directly stored in this folder. Alternatively, the update processing refers to updating the update date and time of the folder. The data operation unit 304 next determines whether the processing of updating the record information in step S609 is successful or unsuccessful (step S610). In the case where it is determined that the processing of updating the record information is successful, the processing proceeds to step S611. In the case where it is determined that the processing of updating the record information is unsuccessful, the processing proceeds to step S616. When the processing proceeds to step S616 from step S610, the transaction management unit 305 executes a rollback. When the rollback is executed, the lock processing in steps S603 and S605, the record deletion processing in step S607, and the update processing for the record information in step S609 are cancelled. After this, the client communication unit 301 notifies the client PC 101 of the deletion error as a response and then ends the processing in FIG. 6 (step S615).

In the case where the processing proceeds to step S611 from step S610, the transaction management unit 305 executes a commit. When the commit is executed, the processing of updating the record information in step S609 is confirmed. In detail, the updating of the record information in the document table of the database server 103 is confirmed, and the record corresponding to the folder and locked in step S603 is unlocked. Next, the data operation unit 304 executes the processing of registering the record, which is to be deleted, in the deletion table of the database server 103 to delete the document file stored in the file sever 104 (step S612). The data operation unit 304 next determines whether the processing of registering the record in the deletion table in step S612 is successful or unsuccessful (step S613). In the case where it is determined that the processing of registering the record in the deletion table is successful, the processing proceeds to step S614. In the case where it is determined that the processing of registering the record in the deletion table is unsuccessful, the processing proceeds to step S615. When the processing proceeds to step S615 from step S613, the client communication unit 301 notifies the client PC 101 of the deletion error as a response and then ends the processing in FIG. 6.

In the case where the processing proceeds to step S614 from step S613, the transaction management unit 305 executes a commit. When the commit is executed, the processing of registering the record in the deletion table in step S612 is confirmed and the to-be-deleted record is thus registered in the deletion table of the database server 103. After the process in step S614, the client communication unit 301 notifies the client PC 101 of the successful deletion as a response to the request to delete the document file (step S615).

[Deletion of Document File from File Server]

Figure 7:
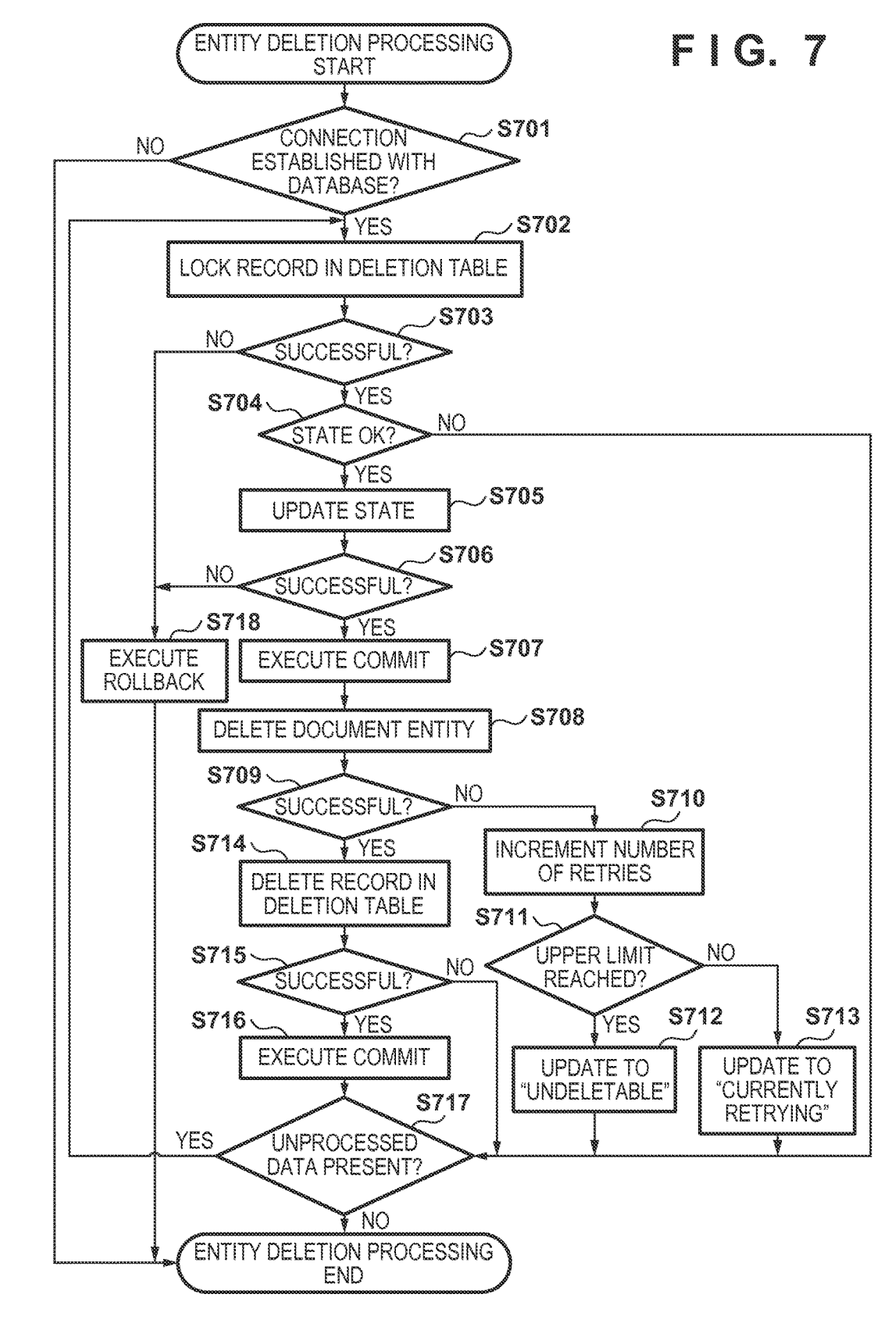
FIG. 7 is a diagram showing a process of deleting a document file from a file server.

FIG. 7 is a flowchart showing the processing of deleting the entity data of the document file registered in the deletion table from the file server 104. The processing shown in FIG. 7 is executed regularly, such as once every hour, using a scheduler or the like. The processing of deleting the entity data is executed asynchronously with the request to register the document file in FIG. 4 or the request to delete the document file in FIG. 6.

The connection establishment unit 302 of the application server 102 establishes connection with the storage areas of the tables in the database server 103, and determines whether the connection establishment with the database server 103 is successful or unsuccessful (step S701). In the case where it is determined that the connection establishment is successful, the processing proceeds to step S702. In the case where it is determined that the connection establishment is unsuccessful, the processing in FIG. 7 is ended.

In the case where it is determined that the connection establishment is successful, the record lock unit 303 obtains one record in the deletion table of the database server 103 and executes the lock processing on the obtained record (step S702). The record lock unit 303 may obtain records in a predetermined order, such as in order of IDs. The record lock unit 303 determines whether the lock processing in step S702 is successful or unsuccessful (step S703). In the case where it is determined that the lock processing is successful, the processing proceeds to step S704. In the case where it is determined that the lock processing is unsuccessful, the processing proceeds to step S718. When the processing proceeds to step S718 from step S703, the transaction management unit 305 executes a rollback. When the rollback is executed, the lock processing executed on the record in step S702 is cancelled. After this, the processing in FIG. 7 is ended.

In the case where it is determined that the lock processing is successful, the record lock unit 303 confirms the state information of the obtained record and determines whether the record is deletable or undeletable (step S704). For example, when the item 523 in FIG. 5 indicates "Wait to be deleted" or "Currently retrying", it is determined that the record is deletable. When the item 523 indicates "Currently being deleted" or "Undeletable", it is determined that the record is undeletable. In the case where it is determined in step S704 that the record is deletable, the processing proceeds to step S705. In the case where it is determined in step S704 that the record is undeletable, the processing proceeds to step S717. In step S717, the presence or absence of an unprocessed record in the deletion table of the database server 103 is determined. In the case where it is determined that the unprocessed record is present, the processing from step S702 is repeated. In the case where it is determined that the unprocessed record is absent, the processing in FIG. 7 is ended.

In the case where the processing proceeds to step S705 from step S704, the data operation unit 304 executes the processing of updating the state information in the item 523 to "Currently being processed". The data operation unit 304 next determines whether the update processing executed on the state information in step S705 is successful or unsuccessful (step S706). In the case where it is determined that the update processing executed on the state information is successful, the processing proceeds to step S707. In the case where it is determined that the update processing executed on the state information is unsuccessful, the processing proceeds to step S718. When the processing proceeds to step S718 from step S706, the transaction management unit 305 executes a rollback. When the rollback is executed, the lock processing executed on the record in step S702 and the update processing executed on the state information in step S705 are cancelled. After this, the processing in FIG. 7 is ended.

In the case where it is determined that the processing of updating the state information is successful, the transaction management unit 305 executes a commit (step S707). When the commit is executed, the processing of updating the state information in step S705 is confirmed. Thus, the state information of the record in the deletion table of the database server 103 is updated.

Next, the document entity operation unit 306 accesses the file server 104, and tries to delete the document file in the file server 104 using the path information of the record obtained in step S702 (step S708). The document entity operation unit 306 determines whether the deletion of the document file in step S708 is successful or unsuccessful (step S709). In the case where it is determined that the deletion of the document file is successful, the processing proceeds to step S714. In the case where it is determined that the deletion of the document file is unsuccessful, the processing proceeds to step S710.

In the case where it is determined that the deletion of the document file is unsuccessful, the data operation unit 304 increments the number of retries in the item 524 of the to-be-deleted record (step S710). The data operation unit 304 determines whether or not the result of the increment reaches the predetermined upper limit (step S711). In the case where it is determined that the upper limit is reached, the processing proceeds to step S712 in which the data operation unit 304 executes the processing of updating the state information of the record to "Undeletable" (step S712). Then, the processing proceeds to step S717. In the case where it is determined that the upper limit is not reached, the processing proceeds to step S713 in which the data operation unit 304 executes the processing of updating the state information of the record to "Currently retrying" (step S713). Then, the processing proceeds to step S717. In other words, the record having the state information indicated as "Currently retrying" is subject to deletion again in the processing in FIG. 7 that is executed after the predetermined period of time. Whether the processing of updating the state information is successful or unsuccessful may be determined in steps S712 and S713. Then, in the case where it is determined that the processing of updating the state information is successful, the processing may proceed to step S717. In the case where it is determined that the processing of updating the state information is unsuccessful in step S712 or S713, a log file describing the state information to be updated may be separately created and then the processing may proceed to step S717.

In the case where it is determined that the deletion of the document file in step S709 is successful, the data operation unit 304 executes the processing of deleting the record obtained in step S702 (step S714). The data operation unit 304 next determines whether the processing of deleting the record in step S709 is successful or unsuccessful (step S715). In the case where it is determined that the processing of deleting the record is successful, the processing proceeds to step S716. In the case where it is determined that the processing of deleting the record is unsuccessful, the processing proceeds to step S717. In the case where it is determined that the processing of deleting the record is successful, the transaction management unit 305 executes a commit. When the commit is executed, the processing of deleting the record in step S714 is confirmed. Thus, the record in the deletion table of the database server 103 is deleted. After this, the processing proceeds to step S717.

Thus, the lock processing is not executed on the entity of the document file stored in the file server 104 when the deletion request is received, as in the case where the registration request is received in FIG. 6. The lock processing is executed on the table in which the document file information is managed. This can reduce adverse effects on the system 100 caused by waiting for the lock release, such as a delay in the processing performed by the overall system.

[Consistency Processing Between Table and File Server]

The following describes the processing of maintaining the consistency between the file server 104 and the document table of the database server 103. Even after the processing shown in FIG. 4, 6, or 7 is performed, the file server 104 includes the document file while the document table of the database server 103 does not include the record corresponding to this document file in some cases. For example, in the case where it is determined in step S414 in FIG. 4 that the processing of registering the record in the deletion table is unsuccessful, the rollback has been previously executed in step S411. Therefore, the processing of registering in the document table of the database server 103 in step S407 and the processing of updating the record information in step S409 have been cancelled. In other words, even though the file server 104 includes the document file, the document table of the database server 103 does not include the corresponding record. Moreover, because the document file is not registered in the deletion table, this document file cannot be deleted by the processing in FIG. 7 and thus remains in the file server 104.

Figure 8:
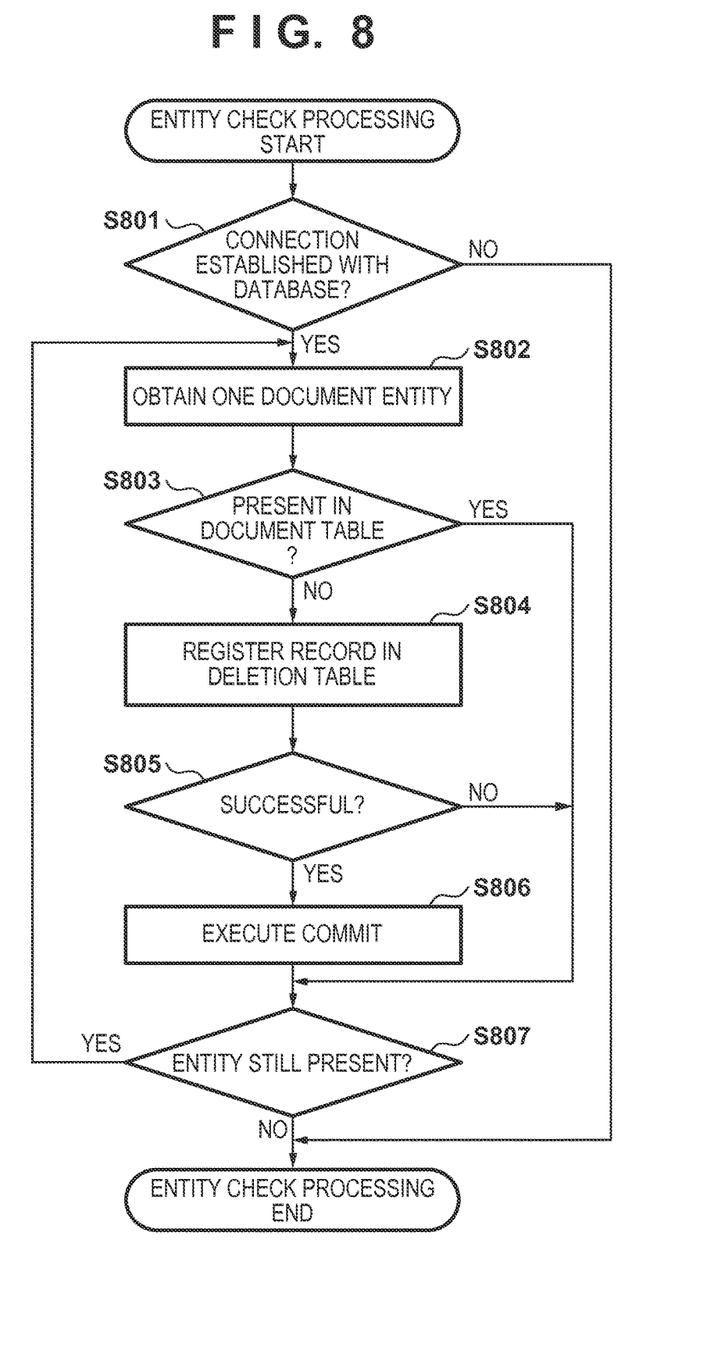
FIG. 8 is a diagram showing a process of maintaining consistency between table information and a storage state in the file server.

FIG. 8 is a flowchart showing the processing of searching the file server 104 to delete the document file having no record in the database server 103. The processing shown in FIG. 8 is executed regularly, such as at a predetermined time of day, using a scheduler or the like.

First, the connection establishment unit 302 of the application server 102 establishes connection with the storage areas of the tables in the database server 103, and determines whether the connection establishment with the database server 103 is successful or unsuccessful (step S801). In the case where it is determined that the connection establishment is successful, the processing proceeds to step S802. In the case where it is determined that the connection establishment is unsuccessful, the processing in FIG. 8 is ended.

In the case where it is determined that the connection establishment is successful, the document entity operation unit 306 obtains information of one document file with reference to the storage state of the document file in the file server 104 (step S802). For example, the document entity operation unit 306 obtains information of the folder structure in the file server 104, and then obtains the path information and filenames of the stored document files sequentially from the folders in order from high order. In step S802, the document entity operation unit 306 does not need to obtain the document file itself.

Next, the data operation unit 304 determines whether or not the record corresponding to this document file is present in the document table of the database server 103, based on the information of the document file obtained in step S802 (step S803). In the case where it is determined that the corresponding record is present, the processing proceeds to step S807 in which whether a document file that is not subject to the current processing is present or absent in the file server 104 is determined. In the case where it is determined in step S807 that the document file that is not subject to the current processing is present, the processing from step S802 is repeated. In the case where it is determined that the document file that is not subject to the current processing is absent, the processing in FIG. 8 is ended.

In the case where it is determined in step S803 that no record corresponding to this document file is present in the document table in the database server 103, the data operation unit 304 executes the processing of registering the information of the document file obtained in step S802 in the deletion table of the database server 103 (step S804). The data operation unit 304 next determines whether the registration processing in step S804 is successful or unsuccessful (step S805). In the case where it is determined that the processing of registering in the deletion table is successful, the processing proceeds to step S806. In the case where it is determined that the processing of registering in the deletion table is unsuccessful, the processing proceeds to step S807.

In the case where it is determined that the processing of registering in the deletion table is successful, the transaction management unit 305 executes a commit (step S806). When the commit is executed, the processing of registering in the deletion table in step S804 is confirmed and then the deletion table of the database server 103 is updated. After this, the process in step S807 is performed.

Thus, even in the case where the file server 104 includes the document file having no record in the document table in the database server 103, the processing in FIG. 8 can maintain the consistency between the information in the table of the database server 103 and the document files in the file server 104.

In the above description, the database server 103 may include a table uniquely corresponding to the storage structure of the document files in the file server 104. In such a case, the application server 102 can search for a document file that is not present in the document table of the database server 103, without accessing the file server 104.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-092003, filed Apr. 25, 2014, which is hereby incorporated by reference herein in its entirety.

What is claimed is:

1. An information processing apparatus capable of communicating with a file server storing a document file and with a storage unit storing information on the document file as a record, the information processing apparatus comprising:

a memory storing computer-executable instructions; and
a processor executing the instructions causing the information processing apparatus to:

accept a request from a client to register a document file;
register entity data of the registration-requested document file in the file server;
execute determination processing of determining whether the entity data is successfully completed registering in the file server, wherein the determination processing is executed to lock a record corresponding to a folder storing the document file in the storage unit;
lock the record corresponding to the folder storing the document file in the storage unit in response to the determination processing determining that completion of the registration of the entity data in the file server is successful;
register information on the registration-requested document file in the storage unit, as a record corresponding to the document file;
update information of the locked record corresponding to the folder storing the document file, and unlock the updated record; and
notify the client of a result of the request to register the document file.

2. The information processing apparatus according to claim 1, wherein the instructions further cause the information processing apparatus to:
cancel the registration done for the record corresponding to the document file, in a case where the information of the record corresponding to the folder storing the document file fails to be updated.

3. The information processing apparatus according to claim 2, wherein the instructions further cause the information processing apparatus to:
delete the entity data of the registration-requested document file from the file server, in a case where the information of the record corresponding to the folder storing the document file fails to be updated.

4. The information processing apparatus according to claim 3, wherein the entity data is deleted asynchronously with the registration request.

5. The information processing apparatus according to claim 1, wherein the instructions further cause the information processing apparatus to:
accept a request to delete a document file;
lock a record corresponding to a folder storing the deletion-requested document file;
lock a record corresponding to the deletion-requested document file;
delete the locked record corresponding to the deletion-requested document file;
update the record corresponding to the locked folder and unlock the updated record, in a case where the record corresponding to the deletion-requested document file is deleted; and
delete entity data of the deletion-requested document file from the file server.

6. The information processing apparatus according to claim 5, wherein the entity data is deleted asynchronously with the deletion request.

7. The information processing apparatus according to claim 1, wherein the storage unit is a database server managing the record as a database.

8. A control method executed by a processor in an information processing apparatus capable of communicating with a file server storing a document file and with a storage unit storing information of the document file as a record, the control method comprising:
accepting a request from a client to register a document file;
registering entity data of the registration-requested document file in the file server;
executing determination processing of determining whether the entity data is successfully completed registering in the file server, wherein the determination processing is executed to lock a record corresponding to a folder storing the document file in the storage unit;
locking the record corresponding to the folder storing the document file in the storage unit in response to the determination processing determining that completion of the registration of the entity data in the file server is successful;
registering information on the registration-requested document file in the storage unit, as a record corresponding to the document file;
updating information of the locked record corresponding to the folder storing the document file, and unlocking the updated record; and
notifying the client of a result of the request to register the document file.

9. A non-transitory computer-readable storage medium storing computer-executable instructions of a program for causing an information processing apparatus capable of communicating with a file server storing a document file and with a storage unit storing information of the document file as a record, to execute a control method, the program comprising:
code for accepting a request from a client to register a document file;
code for registering entity data of the registration-requested document file in the file server;
code for executing determination processing of determining whether the entity data is successfully completed registering in the file server, wherein the determination processing is executed to lock a record corresponding to a folder storing the document file in the storage unit;
code for locking the record corresponding to the folder storing the document file in the storage unit in response to the determination processing determining that completion of the registration of the entity data in the file server is successful;
code for registering information on the registration-requested document file in the storage unit, as a record corresponding to the document file;
code for updating information of the locked record corresponding to the folder storing the document file, and unlocking the updated record; and
code for notifying the client of a result of the request to register the document file.

* * * * *